United States Patent [19]
Ghatta et al.

[11] Patent Number: 6,150,475
[45] Date of Patent: Nov. 21, 2000

[54] POLYESTER RESINS HAVING IMPROVED PROPERTIES

[75] Inventors: Hussain Al Ghatta, Fiuggi; Sandro Cobror, Pozzilli, both of Italy

[73] Assignee: Sinco Engineering S.p.A., Italy

[21] Appl. No.: 09/067,165

[22] Filed: Apr. 27, 1998

[30] Foreign Application Priority Data

Apr. 28, 1997 [IT] Italy ................................ M197A0983

[51] Int. Cl.⁷ ..................................... C08L 67/02
[52] U.S. Cl. ............................................ 525/444; 525/437
[58] Field of Search .................... 525/437, 438, 525/444

[56] References Cited

U.S. PATENT DOCUMENTS

| | | | |
|---|---|---|---|
| 3,804,760 | 4/1974 | Darley | 252/8.55 |
| 3,962,174 | 6/1976 | Berardinelli | 525/438 |
| 4,093,593 | 6/1978 | Go | 260/45.85 |
| 4,161,470 | 7/1979 | Calundann | 260/40 |
| 4,324,869 | 4/1982 | Robeson | 525/68 |
| 4,360,658 | 11/1982 | Jackson, Jr. et al. | 528/193 |
| 4,408,022 | 10/1983 | Cincotta et al. | 525/444 |
| 4,447,577 | 5/1984 | Bayha | 524/845 |
| 4,668,760 | 5/1987 | Boudreaux, Jr. et al. | 528/193 |
| 5,567,780 | 10/1996 | Khouri | 525/394 |

FOREIGN PATENT DOCUMENTS

| | | |
|---|---|---|
| 0 439 138 A2 | 1/1991 | European Pat. Off. . |
| 94/10243 | 5/1994 | WIPO . |
| 94/26821 | 11/1994 | WIPO . |

*Primary Examiner*—Patricia A. Short
*Attorney, Agent, or Firm*—Cook, Alex, McFarron, Manzo, Cummings & Mehler, Ltd.

[57] ABSTRACT

Aromatic polyester resins, having improved mechanical and hydrolysis resistant properties, by mixing said aromatic polyester resin with a phenoxy resin, a dianhydride of a tetracarboxylic acid and liquid crystals.

1 Claim, No Drawings

POLYESTER RESINS HAVING IMPROVED PROPERTIES

BACKGROUND OF THE INVENTION

The present invention is directed to aromatic polyester resins having improved mechanical and hydrolysis resistant properties.

Aromatic polyester resins find a wide application both in fiber and film production as well as in the injection and blow molding.

The hydrolysis resistance of the prior resins is not, however, sufficiently high. In conditions of excessive hydrolysis, the resins become weak with a remarkable loss of tensile properties (elongation, ultimate tensile stress and strength).

It is known that the addition of liquid crystals (PLC) to the polyester resins does not bring about a significant improvement in the mechanical properties of the fibers and films obtained from them. It is necessary to submit fibers and films to sufficiently high stretching ratios in order to obtain such an orientation of the macromolecules as to cause significant increases in the tensile properties. Sufficiently high stretching ratios are not, however, acceptable because of the poor melt strength of the resins.

It has been found (WO-A-94/26821) that the mechanical properties of fibers and films obtained from aromatic polyester resins added with even small quantities of liquid crystals (less than 5% by weight) can be remarkably improved, even under non-excessive stretching conditions, if the resins undergo a solid state polyaddition (SSPA) in the presence of polyfunctional compounds, such as the dianhydrides of tetracarboxylic acids able to react with the resin end groups. Pyromellitic dianhydride (PMDA) is a representative compound.

The addition of liquid crystals to the polyester resins does not cause considerable improvement in the mechanical properties in the resins after extrusion and in the resins subjected to solid state polycondensation treatments. The presence of the liquid crystals has however, a beneficial effect on the hydrolysis resistance.

The addition of dianhydrides, such as PMDA to resins containing liquid crystals does not improve the hydrolysis resistance and the mechanical properties of the resin after extrusion. The mechanical properties and the hydrolysis resistance are considerably improved if the resin undergoes a solid state polycondensation treatment.

SUMMARY OF THE INVENTION AND DETAILED DESCRIPTION OF THE PRESENTLY PREFERRED EMBODIMENTS

It has been now unexpectedly found that it is possible to obtain aromatic polyester resins having improved mechanical and hydrolysis resistant properties if the resins are mixed with:

a) polymeric liquid crystals (PLC) in a quantity from 0.5 to 30% by weight on the resin, preferably 5–20% by weight;

b) a dianhydride of tetracarboxylic acids, preferably aromatic, in a quantity between 0.05 and 2% by weight of the resin, preferably 0.1–0.5% by weight;

c) a phenoxy resin in a quantity from 0.1 to 5% by weight, preferably 0.2–1% by weight. The improvement is more pronounced if the resins are subjected to solid state polyaddition treatments (SSPA).

Fibers and films obtained from the above resins show particularly high mechanical properties even under normal stretching conditions.

The aromatic polyester resins used in the preparation of the resins of the present invention are formed of the product of the polycondensation of an aromatic bicarboxylic acid, or a dialkyly esterthered, with an aliphatic diol with 2–12 carbon atoms.

Terephthalic acid and naphthalenedicarboxylic acids, or their dimethylic esters, are representative compounds.

Examples of aliphatic diols are ethylene glycol, 1,4-butandiol and 1,4-dimethylolcycloexan.

Preferred polyester resins are polyethyleneterephthalate, polybuthyleneterephthalate and polyalkyleneterephthalic copolymers, wherein from 1 to 20% by mols of the units deriving from terephthalic acid are replaced by units deriving from isophthalic acid and/or from a naphthalendicarboxylic acid.

The polyester resins can be added with polymers such as polyamides, polycaprolacton, polycarbonates and polyolefins, generally in quantities lower than 20% by weight.

The resins can contain additives such as antioxidants, heat stabilizers, dyes, pigments, flame retardant compounds, and plasticizers.

The intrinsic viscosity of the resins before the SSPA treatment in general ranges from 0.6 to 0.8 dl/g.

The viscosity can be increased up to values of 1–1.8 dl/g by the SSPA treatment.

The usable phenoxy resins are formed of poly(hydroxy) ethers, poly(hydroxy)esters-ethers and poly(hydroxy) amino-ethers.

Preferred resins contain repeating units $[O-CH_2-CHOH-CH_2-R-CH_2-CHOH-CH_2-O-R^1]$, where R is a bivalent radical chosen among bis(4-oxyphenyl) dimethylmethane, bis(4-oxyphenyl)sulphoxide, bis(1,3-dicarboxyl)dimethylmethane wherein the free valences of the radical are on the oxygen atoms of the benzenic ring or on the oxygen of the carboxylic groups, or R is the radical $>N-CH_2-CH_2OH$; $R^1$ is the bivalent radical bis(4-phenylen)dimethylmethane or 1,3-phenylene.

The resins contain at least 50 repeating units with the above mentioned formula.

The most preferred resins are formed of poly(hydroxy) amino-ethers wherein, in the above mentioned repeating units, R is the bivalent radical $>N-CH_2-CH_2OH$ and $R^1$ is bis(4-phenylen)dimethylmethane.

The polymeric liquid crystals are polymeric substances that tend to maintain a crystalline order also at the melt state.

Usable representative liquid crystals are:

Poly(oxybenzoil-co-ethyleneterephthalate) (PHBA/ET:4/1) produced by Eastman Chemical & Unitika and commercialized under the trade mark of Rodrum (melting point 230° C.);

Poly(oxybenzoil-co-biphenylterephthalate) (PHBA/TA:2/1) produced by Amoco Performance Products and commercialized under the trade mark of Xydar;

Poly(oxybenzoil-co-oxynaphtoil) (PHBA/HNA:7/3) produced by Hoechst/Celanese and commercialized under the trade mark of Vectra A 950 (melting point 275° C.);

Poly(phenyl-para-phenylenterephthalate) produced by DuPont (melting point 340° C.).

Crystals of the above mentioned type are described in U.S. Pat. Nos. 3,804,760; 4,161,470; 4,093,593; 4,447,577; 4,668,760 and 4,360,658 whose descriptions are hereby incorporated by reference.

Vectra A 950 liquid crystals of Hoechst/Celanese are preferred.

Representative dianhydrides of the tetracarboxylic acids are pyromellitic dianhydride, which is the most preferred one, the dianhydride of benzophenontetracarboxylic acid, the dianhydride of tetrahydrophurantetracarboxylic acid and the dianhydrides of cyclopentanetetracarboxylic and cyclobutanetetracarboxylic acids.

The dianhydrides can be used in the form of adducts with ethylene glycol or polyalkyleneglycols in the ratio of two mols of anhydride for one of the glycol compound.

The liquid crystals are incorporated in the polyester resin under such mixing conditions as to assure a homogeneous distribution of the same in the polymeric matrix.

The preferred method involves mixing the liquid crystals in the molten mass of the resin working at a temperature between 250° and 380° C. The temperature is chosen as a function of the workability temperature of the liquid crystals.

Twin screw extruders are preferably used. The residence time in the extruders generally ranges from 20 to 200 seconds.

The dianhydride of the tetracarboxylic acid and the phenoxy resin can be incorporated contemporaneously with the liquid crystals, or alternately, the liquid crystals and the phenoxy resin are first mixed in an extruder utilizing for example 5–10% of the phenoxy resin and then using such a quantity of liquid crystals as to introduce the desired quantity of the phenoxy resin.

The polyester resins of the present invention are converted into fibers and films or into bioriented items according to conventional methods.

Examples of bioriented items are sheets, whose biorientation is obtained through calendering, and containers obtained through injection blow molding.

The stretching ratio applied to fibers and films usually ranges from 2:1 to 20:1. The stretching temperature is a little higher than the polymer Tg in the case of film and bioriented items stretching. Suitable temperatures range from 80° to 120° C.

In the case of fibers, the stretching can be made in two steps: in the first at temperatures lower than the Tg and in the second, at higher ones. In the case of films, the stretching ratio preferably ranges from 4:1 to 9:1, while in the case of fibers, from 2:1 to 10:1.

Fibers, films and oriented objects that can be obtained from the resins of the present inventions find application in all those sectors where high mechanical properties and good hydrolysis resistance are required, and also where gas barrier properties are required.

As already indicated, the resins of the present invention have remarkably improved mechanical and hydrolysis resistance properties after solid state polyaddition treatment.

The treatment temperature generally ranges from 160 to 220° C., preferably 180–210° C.

The residence times (generally from 1 or more hours) are chosen as a function of the desired increase of the intrinsic viscosity of the resin. It is operated under inert gas (nitrogen) atmosphere.

The intrinsic viscosity of the resins is measured in a solution (40/60 by weight) of phenol/tetrachloroethane at 25° C. (0.5 g of resin in 100 ml of solvent).

The following examples are supplied to illustrate but not to limit the present invention.

EXAMPLE 1

5 kg/hr of a mixture (previously vacuum dried at 140° C. for 12 hours) of PET from dimethylterephthalate (IV=0.62 dl/g) and 0.4% of pyromellitic dianhydride (PMDA) has been fed continuously to an intermeshing counter-rotating conic twin screw extruder together with 10% by weight of Vectra A 950 liquid crystal of Hoechst Celanese previously mixed in a monoscrew extruder with 7.5% by weight of Paphen phenoxy resin of Union Carbide.

Extrusion Conditions

Rotation of the screw: 100 rpm

Temperature of the cylinder: 285° C.

Feeding throughput: 5 kg/hr

Average residence time in the extruder: 2 minutes

PMDA feeding: 0.25 kg/hr

The obtained pellets are vacuum dried at 140° C. for at least 12 hours and then injection extruded at 280–285° C. to produce Dumbells specimens (3 mm thick).

The IV after extrusion was 0.62 dl/g.

COMPARISON EXAMPLE 1

Example 1 is repeated with the difference that 5 kg/hr of PET and 0.25 kg/hr of PMDA are fed to the twin screw extruder.

COMPARISON EXAMPLE 2

Example 1 is repeated with the difference that 5 kg/hr of PET are fed to the twin screw extruder.

COMPARISON EXAMPLE 3

Example 1 is repeated with the difference that 5 kg/hr of PET mixed with 10% by weight of Vectra A 950 are fed to the twin screw extruder.

COMPARISON EXAMPLE 4

Example 1 is repeated with the difference that 5 kg/hr of PET mixed with 0.4% by weight of PMDA and 10% by weight of Vectra A 950 are fed to the twin screw extruder.

The Dumbell specimens of all examples have been subjected to hydrolysis resistance tests at 90° and 120° C. for 16 hours using a batch reactor.

The Dumbell specimens have been also subjected to solid state polyaddition (SSPA) at 180° C. for 60 hours before the hydrolysis treatment.

The tensile properties have been determined on the specimens (both after extrusion and SSPA) after the hydrolysis treatment.

The results are reported in Table 1.

The therein reported breaking energy is a quantity reflecting both the breaking stress and the elongation at break: the higher the energy, the tougher the material. In contrast low values of breaking energy show fragility of the material.

Table 1

Mechanical properties of Dumbell specimens as such after injection (Specimens 1) and after SSPA at 180° C. (Specimens 2). The specimens have been subjected to a hydrolysis treatment at 90° C. for 16 hours (Specimens A) and at 120° C. for 16 hours (Specimens B).

| Example | Specimens | Module (GPa) | Breaking Stress (MPa) | Elongation % | Breaking Energy J/mm |
|---------|-----------|--------------|----------------------|--------------|----------------------|
| 1.      | 1A        | 2.5          | 120                  | 7.0          | 7.0                  |
|         | 1B        | 3.4          | 110                  | 3.3          | 2.7                  |
|         | 2A        | 2.7          | 172                  | 8.3          | 9.7                  |
|         | 2B        | 3.1          | 130                  | 4.8          | 4.0                  |

-continued

| Example | Specimens | Module (GPa) | Breaking Stress (MPa) | Elongation % | Breaking Energy J/mm |
|---|---|---|---|---|---|
| Comp.Ex. 1 | 1A | 2.6 | 69 | 6.0 | 3.0 |
| | 1B | 3.2 | 32 | 1.0 | 0.2 |
| | 2A | 3.0 | 110 | 4.3 | 3.1 |
| | 2B | 3.2 | 32 | 2.6 | 0.2 |
| Comp.Ex. 2 | 1A | 2.4 | 60 | 8.0 | 3.1 |
| | 1B | 2.9 | 32 | 1.0 | 0.2 |
| | 2A | 2.8 | 120 | 4.0 | 3.7 |
| | 2B | 2.9 | 32 | 1.0 | 0.2 |
| Comp.Ex. 3 | 1A | 2.7 | 120 | 7.0 | 7.0 |
| | 1B | 3.4 | 110 | 3.3 | 2.0 |
| | 2A | 3.0 | 130 | 4.3 | 3.1 |
| | 2B | 3.4 | 89 | 3.6 | 1.3 |
| Comp.Ex. 4 | 1A | 2.7 | 124 | 6.0 | 7.0 |
| | 1B | 3.4 | 94 | 2.8 | 2.0 |
| | 2A | 2.8 | 160 | 5.8 | 5.3 |
| | 2B | 3.4 | 122 | 3.8 | 2.9 |

The properties of the specimens as such (Specimens A), after SSPA (Specimens B) and prior to the hydrolysis treatment are reported in Table 2:

TABLE 2

| Example | Specimens | Module (GPa) | Breaking Stress (MPa) | Elongation % | Breaking Energy J/mm |
|---|---|---|---|---|---|
| 1. | A | 2.5 | 120 | 7.0 | 7.0 |
| | B | 2.7 | 180 | 8.3 | 10.4 |
| Comp.Ex. 1 | A | 2.6 | 69 | 6.0 | 3.0 |
| | B | 3.0 | 132 | 4.9 | 4.2 |
| Comp.Ex. 2 | A | 2.4 | 60 | 6.0 | 3.1 |
| | B | 2.9 | 130 | 5.3 | 4.4 |
| Comp.Ex. 3 | A | 2.7 | 113 | 6.0 | 7.0 |
| | B | 3.0 | 131 | 4.5 | 3.4 |
| Comp.Ex. 4 | A | 2.7 | 114 | 6.0 | 7.0 |
| | B | 2.9 | 150 | 5.8 | 5.5 |

EXAMPLE 2

The composition of Example No. 1, previously dried at 140° C. for 12 hours, has been extruded in an intermeshing counter-rotating conic twin screw extruder equipped with a 30 mm wide flat die and filmed with various stretching ratios using winding cylinders cooled at 5° C.

The stretching ratios have been calculated using the ratio between the area of the die and the cross section of the films.

The extrusion conditions were:
Rotation of the screw: 100 rpm
Temperature of the cylinder: 285° C.
Residence time: 2 minutes.

The mechanical properties of the film are reported in Table 3.

COMPARISON EXAMPLE 5

The composition of Comparison Examples 1, 2, 3 and 4 have been fed to the twin screw extruder of Example 2 and filmed with various stretching ratios.

In the case of the PET of Comparison Example 2, it was not possible to use a stretching ratio of 17:1 because of the insufficient melt strength of the material.

The mechanical properties of the film are reported in Table 3.

EXAMPLE 3

Fibers from PET (IV=0.6 dl/g) containing 0.4% of PMDA and 20% of Vectra A 950 with and without phenoxy resin have been prepared. The above mentioned percentages are by weight.

The mechanical properties of the fibers were the following:

| | | Module (GPa) | Stress (MPa) |
|---|---|---|---|
| 1) | PET + 0.4% PMDA + 20% Vectra | 3.9 | 22 |
| 2) | 0.25% phenoxy resin + PET + 0.4% PMDA + 20% Vectra | 7.4 | 48 |
| 3) | As in 2) but with phenoxy resin 0.5% | 11.1 | 92 |
| 4) | As in 2) but with phenoxy resin 0.75% | 16.7 | 165 |
| 5) | As in 2) but with phenoxy resin 1% | 9.0 | 72 |
| 6) | As in 2) but with phenoxy resin 2% | 6.2 | 45 |

TABLE 3

| Film | Stretching Ratio | Module (GPa) | Breaking Stress (MPa) | Elongation % |
|---|---|---|---|---|
| Ex. 1 | 2.5 | 3.9 | 88 | 11 |
| | 10.0 | 5.2 | 110 | 4 |
| | 17.0 | 5.9 | 115 | 4 |
| Comp.Ex. 1 | 2.5 | 1.8 | 43 | 270 |
| | 10.0 | 1.8 | 42 | 300 |
| | 17.0 | 1.7 | 46 | 240 |
| Comp.Ex. 2 | 2.5 | 1.7 | 42 | 320 |
| | 10.0 | 1.8 | 44 | 310 |
| | 17.0 | 1.8 | 41 | 320 |
| Comp.Ex. 3 | 2.5 | 2.8 | 51 | 16 |
| | 10.0 | 3.7 | 57 | 11 |
| Comp.Ex. 4 | 2.5 | 3.4 | 71 | 14 |
| | 10.0 | 4.5 | 92 | 19 |
| | 17.0 | 5.5 | 115 | 4 |

What is claimed is:

1. A composition comprising:

an aromatic polyester resin mixed with
  a) from 0.5 to 30% by weight of polymeric liquid crystal;
  b) from 0.05 to 2% by weight of a dianhydride of a tetracarboxylic acid; and
  c) from 0.05% to 5% by weight of a phenoxy resin selected from the group consisting of poly(hydroxy) ethers, poly(hydroxy)ethers-esters, poly(hydroxy) amino-ethers, subjected to a solid state polyaddition treatment.

* * * * *

UNITED STATES PATENT AND TRADEMARK OFFICE
CERTIFICATE OF CORRECTION

PATENT NO. : 6,150,475
DATED : November 21, 2000
INVENTOR(S) : Ghatta et al.

It is certified that error appears in the above-identified patent and that said Letters Patent is hereby corrected as shown below:

Title page,
Please change the Assignee information as follows:
-- [73] Assignee: Sinco Ricerche S.p.A., Italy --

Signed and Sealed this

Seventh Day of May, 2002

Attest:

JAMES E. ROGAN
*Attesting Officer*   *Director of the United States Patent and Trademark Office*